Nov. 18, 1941.      A. E. LEVENDOSKI ET AL      2,263,465
ADJUSTABLE COWLING CLOSURE
Filed Aug. 25, 1938      3 Sheets-Sheet 1
FIG.1.
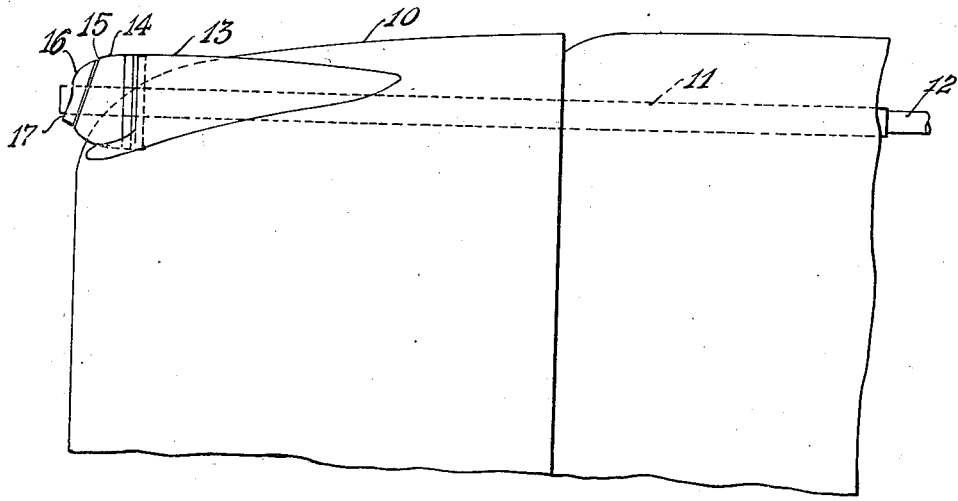
FIG.2.
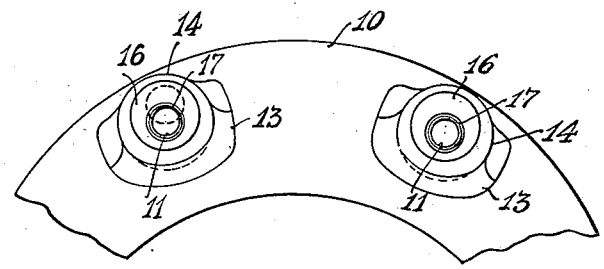
FIG.3. 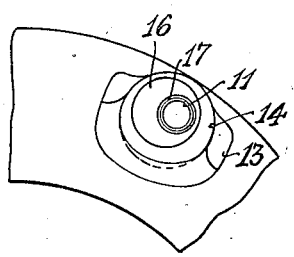 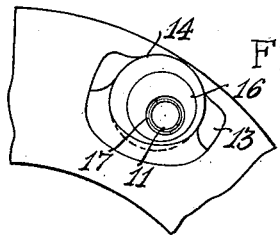 FIG.4
INVENTORS
ALFRED E. LEVENDOSKI
CHARLES F. ZIMMERMAN &
BY  RAYMOND P. HOLLAND, Jr.
ATTORNEY Nov. 18, 1941.  A. E. LEVENDOSKI ET AL  2,263,465
ADJUSTABLE COWLING CLOSURE
Filed Aug. 25, 1938  3 Sheets-Sheet 2

INVENTORS
ALFRED E. LEVENDOSKI
CHARLES F. ZIMMERMAN &
RAYMOND P. HOLLAND, Jr.
BY
ATTORNEY

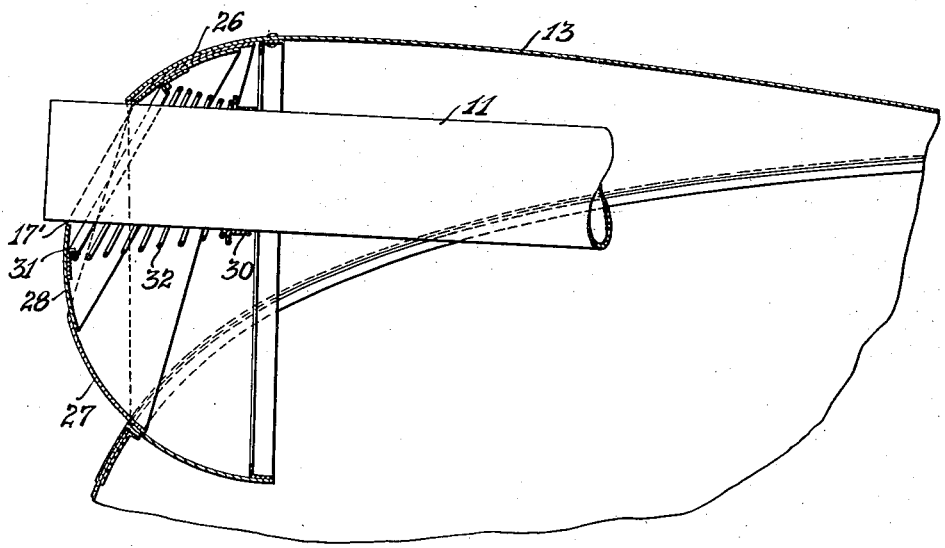
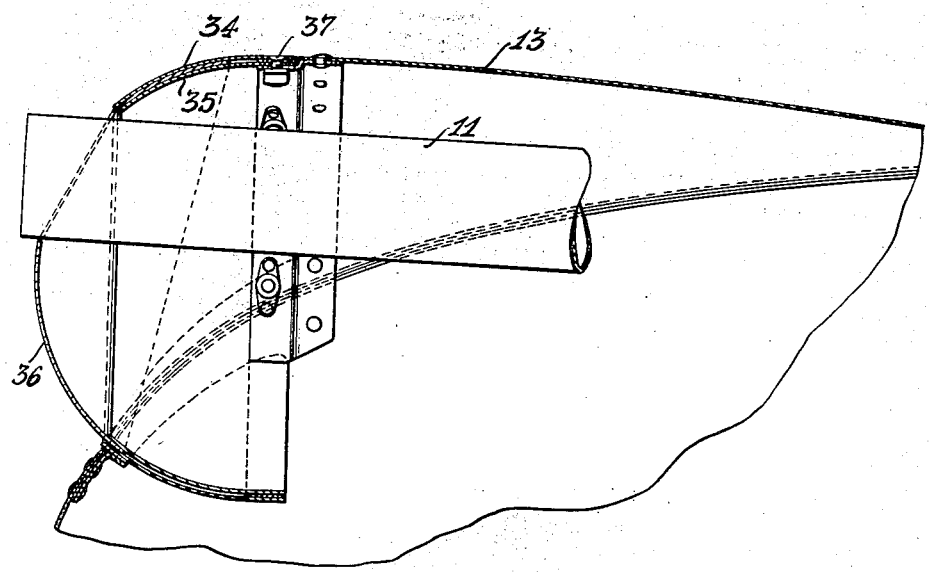

Patented Nov. 18, 1941

2,263,465

UNITED STATES PATENT OFFICE 2,263,465

ADJUSTABLE COWLING CLOSURE

Alfred E. Levendoski, Buffalo, and Charles F. Zimmerman and Raymond P. Holland, Jr., Kenmore, N. Y., assignors to Curtiss-Wright Corporation, a corporation of Delaware Application August 25, 1938, Serial No. 226,708

11 Claims. (Cl. 89—37.5)

This invention relates to adjustable closures, and is particularly concerned with an adjustable closure adapted for use with aircraft.

An object of the invention is to provide a streamlined adjustable fairing for use with a machine gun or blast tube thereof which protrudes from a forward part of the aircraft. In military aircraft, fixed machine guns are mounted for forward firing and are located in any one of several positions such as, in the wing leading edge, in landing gear fairings, or in the cowling which embraces an aircraft power plant. The opening in the aircraft surface through which the gun or blast tube projects must be of somewhat larger diameter than the gun or tube to allow for changes in the aiming position of the gun. For instance, the guns are mounted in cradles which are adjustable with respect to the aircraft wing in order to bring the line of fire of the gun into certain relationship with the axis of symmetry of the airplane, and accordingly, the extending end of a gun barrel may move an appreciable distance with respect to the surface of the aircraft, the aircraft having an opening appropriate to the change in position of the gun barrel. In modern high speed aircraft, such forward openings are undesirable, as they would induce unnecessary drag and a considerable blast of air within the aircraft structure, and a closure for the space between the barrel or tube and the edges of the aircraft opening is desirable. The form of this closure should lend itself to proper streamlining and accordingly, a further object of the invention is to provide an adjustable streamlined closure for guns or blast tubes at the point where they project from the surface of an aircraft.

Further objects and advantages will be apparent from a reading of the annexed specification and claims, together with an examination of the accompanying drawings, in which:

Fig. 1 is a side elevation of a portion of an aircraft power plant cowling indicating a gun blast tube and a forward fairing and closure therefor;

Figs. 2, 3 and 4 are front elevations of cowling segments showing the blast tubes in different positions of adjustment with respect to the cowling and showing the adjustable closure in appropriate positions;

Figs. 7 and 8 are enlarged fragmentary sections showing alternative arrangements of an adjustable closure.

Figure 5:
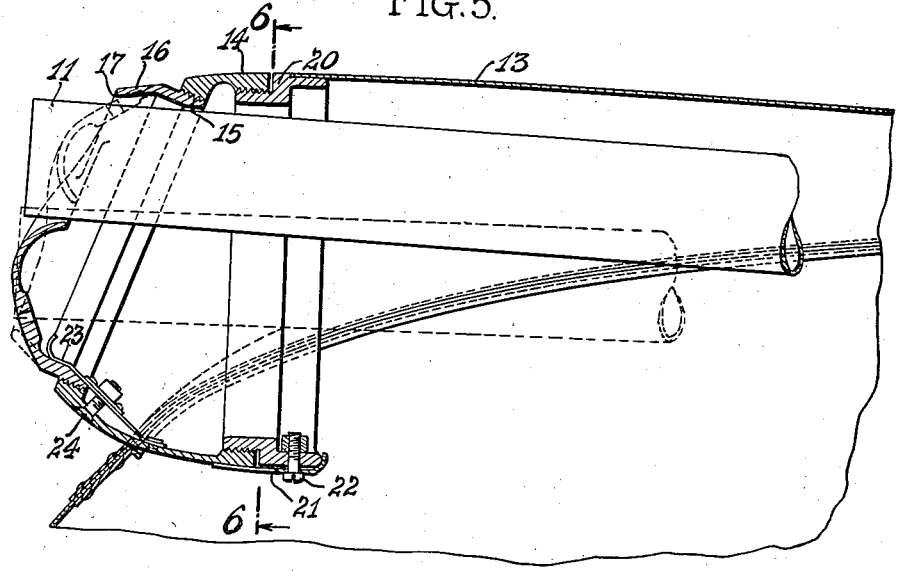
Fig. 5 is an enlarged fragmentary section of one embodiment of adjustable streamlined closure.
Figure 6:
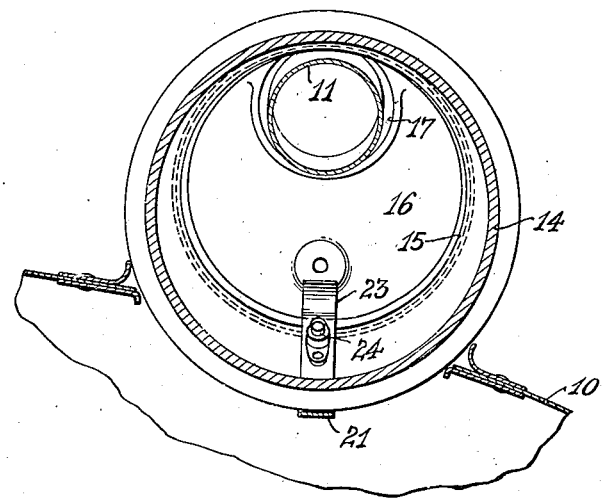
Fig. 6 is a section on the line 6—6 of Fig. 5.

In the figures, 10 represents an aircraft power plant cowling of annular form as is conventionally used with radial aircraft engines, but for the purpose of this invention, the cowling 10 may likewise be considered as representing a forwardly disposed external aircraft surface such as a wing, fuselage, or landing gear fairing. A blast tube 11 forming a forward prolongation of a gun barrel 12 projects through the surface of the cowling 10 to a point forward thereof, and to provide for lateral and vertical adjustment of the blast tube 11, the cowling is provided with a streamlined fairing 13 defining at its forward end a substantially circular aperture, the edges of which have clearance with respect to the tube 11. To the forward edge of the fairing 13 is rotatably attached a hemispherical element 14 having an eccentric opening 15, to the edges of which in turn, a concentric spherically segmental element 16 is rotatably attached. The segment 16 has an opening 17 having little or no clearance with respect to the blast tube 11. The elements 14 and 16 together provide a substantially streamlined nose for the fairing 13 regardless of the relative rotational adjustment thereof. By the eccentric openings respectively formed in the elements 14 and 16, the tube 11 may be located in sundry positions, as shown in Figs. 2, 3 and 4. The elements 14 and 16 are rotated with respect to each other and with respect to the fairing 13 so that the blast tube opening 17 may lie either concentric with the fairing 13 or eccentric thereto in various angular positions.

Figs. 5, 6, 7 and 8 show various embodiments of detailed devices, Fig. 5 including the element 14 screwed to a collar 20 fixed to the fairing 13. The eccentric opening 15 therein is formed with screw threads to receive complementary screw threads on the segmental element 16. The element 16 may be rotated upon the screw threads with respect to the element 14, and likewise, the element 14 may be rotated on its screw threads with respect to the collar 20. To prevent inadvertent rotation of the several parts, a spring drag 21 bears upon the element 14 and is screwed to the collar 20, as at 22, and likewise, a spring drag 23, attached to the element 14 by a screw 24, bears upon the inside of the element 16.

In Fig. 7 the fairing 13 is provided with a spherically segmental forward end 26 within which a spherical segment 27 is nested and within the latter, in turn, a smaller spherical segment 28 is disposed. These several segments, 26, 27 and 28 are concentric and are slidable upon one another so that the blast tube opening 17' in the smaller segment 28 may be moved to any appropriate position within the limits defined by the diameter of the forward opening in the segment 27. To hold the several segments in proper position, the blast tube is provided with an abutment 30, and the smaller segment 28 is provided with an abutment 31, a compression spring 32 extending between the abutments and tending to urge the small segment 28 forwardly, thus holding the several segments in their proper disposition. When adjustment of the blast tube 11 is effected, the several segments simply slide upon one another and it is unnecessary to rotate them with respect to each other.

In Fig. 8, the fairing 13 is provided with annular spherically segmental elements 34 and 35 defining between the nested elements a spherical gap, the segments supporting another spherical segment 36. The segment 36 is slidable and rotatable with respect to the segments 34 and 35, the openings in the several segments being appropriate to the size of the blast tube 11 and to the range of movement which is necessary for its proper adjustment. In this last embodiment, no spring is necessary as in the showing of Fig. 7, since the segment 36 is held from inadvertent rearward displacement by the concentric segment 35. The segment assembly comprising the units 34, 35 and 36, may be unitary, and may be attached as a unit to the forward end of the fairing 13 by suitable screws 37 or other appropriate devices.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In aircraft having a substantially circular opening, a spherical segment rotatably disposed adjacent the edge of the opening and having an eccentric circular opening; and a second spherical segment spherically concentric with the first, rotatably disposed in the opening of the first segment and having an opening eccentric to its segment circumference, whereby the center of said last opening is adjustable radially and angularly relative to the center of the aircraft opening by rotating one or more of said spherical segments.

2. In a closure for an enlarged opening in a forwardly facing part of an aircraft, a plurality of relatively movable concentric spherical segments of graduated base diameter nested and rotatable relative to one another, successive segments having eccentric openings of graduated diameter fitted to the bases of the next smaller segments, the smallest opening of the smallest segment being adapted to embrace a cylindrical element projecting therethrough, said smallest opening being adjustable as to position through relative motion of said segments relative to one another.

3. In a closure for an enlarged opening in a forwardly facing part of an aircraft, a plurality of concentric spherically formed segments, each larger segment having an eccentric opening to the edges of which the next smaller segment is rotatably secured, the smallest segment having an opening through which a cylindrical element is passed for lateral and vertical adjustment relative to the aircraft.

4. In an aircraft cowling having a slanted forward portion, a fore-and-aft open-ended tube faired thereto, a slender cylindrical element projecting through said tube forward of its open end, the element being adjustable laterally and vertically within said tube; and a closure for the forward end of said tube comprising concentric spherical segments one attached to the edges of the tube and rotatable relative thereto and having an eccentric opening, and another closely embracing the cylindrical element and movable over a surface of the first segment.

5. In an aircraft cowling having a slanted forward portion, a fore-and-aft open-ended tube faired thereto, a slender cylindrical element projecting through said tube forward of its open end, the element being adjustable laterally and vertically within said tube; and a closure for the forward end of said tube comprising concentric spherical segments one attached to the edges of the tube and rotatable relative thereto and having an eccentric opening, another closely embracing the cylindrical element and movable over a surface of the first segment, and means to hold the segments in concentric relation.

6. In an aircraft cowling having a slanted forward portion, a fore-and-aft open-ended tube faired thereto, a slender cylindrical element projecting through said tube forward of its own end, the element being adjustable laterally and vertically within said tube; and a closure for the forward end of said tube comprising a first spherical segment rotatably carried by the tube at its open end, said segment having an eccentric opening, and a second spherical segment rotatably carried by the first at the edge of its opening, said second segment having an eccentric opening through which said cylindrical element snugly passes.

7. In an aircraft cowling having a slanted forward portion, a fore-and-aft open-ended tube faired thereto, a slender cylindrical element projecting through said tube forward of its open end, the element being adjustable laterally and vertically within said tube; a closure for the forward end of said tube comprising concentric spherical segments, the first secured at its outer edge to the tube and having an enlarged opening, and a second segment overlapping and movable over the one and having an opening closely fitted to said element.

8. In an aircraft cowling having a slanted forward portion, a fore-and-aft open-ended tube faired thereto, a slender cylindrical element projecting through said tube forward of its open end, the element being adjustable laterally and vertically within said tube; a closure for the forward end of said tube comprising concentric spherical segments, the first secured at its outer edge to the tube and having an enlarged opening, a second segment overlapping and movable over the one and having an opening closely fitted to said element, and resilient means retaining the second segment in contact with the first segment.

9. In an aircraft cowling having a slanted forward portion, a fore-and-aft open-ended tube faired thereto, a slender cylindrical element projecting through said tube forward of its open end, the element being adjustable laterally and vertically within said tube; a closure for the forward end of said tube comprising concentric spherical segments, the first secured at its outer edge to the tube and having an enlarged opening, a second segment overlapping and movable over the one and having an opening closely fitted to said element, and a third segment secured to and similar to the first segment and defining therewith a segmental slot within which the second segment is movable.

10. In aircraft having an enlarged circular gun port, a spherical member fitted to the edge of the opening, rotatable relative to the aircraft and having an eccentric circular opening, and a second spherical member rotatably fitted to the edge of the opening of the first member having an eccentric opening for passage therethrough of a gun barrel, the position of the gun opening being adjustable radially and angularly by rotation of said members.

11. In aircraft having a circular gun port opening; a member fitted in said opening for rotation relative to the aircraft and having an eccentric circular opening; a second member fitted in said eccentric opening for rotation relative to the first member, and having therein a gun opening eccentric to the opening of the first member through which gun opening a gun barrel may be passed, the position of the gun opening being adjustable radially and angularly by relative and joint rotation of said members.

ALFRED E. LEVENDOSKI.
CHARLES F. ZIMMERMAN.
RAYMOND P. HOLLAND, JR.